(12) United States Patent
Serres et al.

(10) Patent No.: US 7,281,631 B2
(45) Date of Patent: Oct. 16, 2007

(54) PROCESS FOR DE-INKING PAPER PULP AND FLOTATION CELL USED FOR THIS PROCESS

(75) Inventors: Alain Serres, Reims (FR); Xavier Lacour, Vitry le Francois (FR); Stephan Pottier, Frignicourt (FR)

(73) Assignee: Kadant Lamort, Societe par actions simplifiee, Vitry le Francois (FR)

( * ) Notice: Subject to any disclaimer, the term of this patent is extended or adjusted under 35 U.S.C. 154(b) by 430 days.

(21) Appl. No.: 10/845,776

(22) Filed: May 14, 2004

(65) Prior Publication Data

US 2004/0232053 A1    Nov. 25, 2004

(30) Foreign Application Priority Data

May 15, 2003  (FR) .................. 03 05814
Apr. 27, 2004  (FR) .................. 04 50806

(51) Int. Cl.
*B03D 1/24*    (2006.01)
*D21F 1/70*    (2006.01)
*D21C 5/02*    (2006.01)
*D21H 11/14*   (2006.01)

(52) U.S. Cl. .......................................... 209/170; 162/4
(58) Field of Classification Search ............... 209/170; 162/4

See application file for complete search history.

(56) References Cited

U.S. PATENT DOCUMENTS 5,330,655 A * 7/1994 Schweiss et al. ............ 210/703
5,650,044 A * 7/1997 Serres ........................... 162/4
6,197,153 B1 * 3/2001 Serres ........................... 162/4

\* cited by examiner

*Primary Examiner*—Thomas M. Lithgow
(74) *Attorney, Agent, or Firm*—Egbert Law Offices (57) ABSTRACT

The cell includes an enclosure having, at the top, a main inlet for the pulp to be de-inked and, at the bottom, a main outlet for the de-inked pulp. The pulp from the top to the bottom, passes through successive stages provided with bubble passageways introduced into the lower portion of the enclosure, and the bubbles rise to the top, to form a foam. The cell includes pulp a guiding mechanism forming a guiding path and in which the bubble passageways are provided for. The guiding mechanisms are, on their lower face, inclined upwards in order to guide the bubbles towards the bubble passageways.

32 Claims, 6 Drawing Sheets

PROCESS FOR DE-INKING PAPER PULP AND FLOTATION CELL USED FOR THIS PROCESS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a process for de-inking paper pulp and a flotation cell used for this process.

The present invention more particularly relates to the de-inking of paper pulp proceeding from old papers one wants to re-use.

BACKGROUND OF THE INVENTION

Old papers are first of all converted into the state of pulp by an apparatus commonly referred to as pulper and this pulp is then depleted from its various foreign bodies, referred to as contaminants, by causing it to pass through sieves. However, after this elimination of the contaminants, the pulp contains ink particles which should be eliminated in order to obtain a quality paper.

The pulp depleted from the coarse foreign bodies comprises three types of components, namely the fibers, the fines which are the complement to the fibers of the non-mineral portion, and the fillers which constitute the remaining mineral portion.

One step of the paper pulp treatment is the de-inking which generally comprises the injection of air into the pulp, in order to create air bubbles on the walls of which the ink particles are fixed. Through this operation of ventilation, a foam formed of bubbles the walls of which retain ink particles is caused to appear at the surface of the paper pulp. This foam is then evacuated.

Generally, in order to increase the probability of collecting the ink particles, the time of contact between the pulp and the bubbles is increased and, to this end, it is desirable to have a flow of bubbles and pulp which mix as soon as possible, and bubbles which remain as long as possible in the pulp flow. A small size of the bubbles also allows to increase this probability of collecting.

To optimize the treatment according to this knowledge, from the applicant's French patent application FR 9402886 is known a process for de-inking by means of air bubbles consisting in creating in an enclosure, by successive re-flowing of the paper pulp from one stage to the next one, from the top to the bottom of the enclosure, a downward movement of the paper pulp, this movement being crossed by an upward movement of bubbles, so that at each stage the current of pulp is crossed by a current of bubbles almost perpendicular to the current of pulp.

This process is implemented in a flotation cell the main role of which is to eliminate the ink and to extract the foam formed at the surface. However, even though the air bubbles collect the ink particles which are hydrophobic, they also draw with them some fibers which are then eliminated together with the foams.

In order to limit the fiber losses during this treatment by flotation, the applicant provides, in his French patent application FR 9 715 839, a process with counter-washing of the bubbles by means of a water supply in the upper portion of the enclosure of the flotation cell.

Also, in European patent EPO 674 040 are provided, at each stage, inlets/outlets to a paper pulp recycling system, each recycling system being provided with a pump for re-injecting the paper pulp into the lower stage. Pumping causes the speed of the paper pulp to accelerate, in order to reach the speed necessary for the operation of the device.

Even though these flotation cells are generally satisfactory, their energy consumption is relatively high. Furthermore, most of the waste is produced during the flotation and it would be desirable to reduce this waste which is generally comprised of 10% of fibers, 30% of fines and 60% of fillers. Especially the loss of fibers should be limited, in order to save noble raw material.

BRIEF SUMMARY OF THE INVENTION

Thus, the purpose of the invention is to provide a process and a flotation cell allowing to reduce the energy consumption, to limit the rejections, but also allowing a higher modularity than what is the case for the current cells.

An object of the invention is a process for paper pulp de-inking in which the pulp to be de-inked is circulated in a flotation cell including an enclosure with vertical axis, the pulp moving from the top to the bottom successively passing through a plurality of stages in each one of which it is crossed by air bubbles introduced into the lower portion of the enclosure and which move from the bottom to the top passing through bubble passageways provided for between the successive stages, the bubbles mixing with the pulp and separating again from the latter in each stage, in order to form, when they arrive at the top, a foam loaded with hydrophobic particles which is evacuated, the de-inked paper pulp being evacuated at the lower portion of the enclosure and, during its movement from the top to the bottom, guided by guiding means extending on both sides of the axis of said enclosure, so as to form a guiding path in which said bubble passageways are provided for.

The bubbles are, in each stage, likely to raise while following the lower face of said guiding means, so as to arrive in said bubble passageways, in order to pass over to a higher level.

There is created an acceleration of the speed of the pulp at the location of said bubble passageways, in order to thus aspire the bubbles leaving said passageways, to mix them with the pulp, said acceleration of the pulp being achieved by gradually reducing the cross-section of the pulp passageway on said guiding means immediately upstream of said bubbles passageways.

According to other features of the invention:

the ratio between the speed of circulation of the bubbles and the speed of circulation of the pulp is advantageously between 0.5 and 2, preferably between 0.7 and 1.3 said guiding means are arranged so as to form a guiding path which is in the form of a widening at least over a portion extending downstream of said bubble passageways;

said guiding means are arranged so as to form a guiding path with a substantially constant cross-section at least over a portion extending downstream of said bubble passageways;

said guiding means are arranged so as to form a guiding path which is ascendant in the direction of flowing of the pulp and which extends at least over a portion downstream of said bubble passageways;

said guiding means are arranged so as to form a helical guiding path;

said guiding means are arranged so as to form a zigzag guiding path;

the bubbles released from the pulp are concentrated in a free space provided for immediately below each bubble raising passageway;

the raising of the bubbles is prevented immediately behind said bubble passageways, in order to oblige the bubbles to pass directly through said passageways;

in each stage, the air bubbles leaving said bubble passageways are distributed over the full width of the pulp guiding path;

before its arrival at the bottom, the whole or part of the pulp is deviated towards a re-circulation circuit, in order to re-inject it into said lower portion of the enclosure, said bubbles being, furthermore, separated from the pulp re-injected in a zone of separation defined in said lower portion of the enclosure;

said re-circulation circuit in which the pulp is caused to circulate comprises a pulp tower;

the de-inked pulp is evacuated through a main outlet at the bottom of said enclosure, said main outlet being put into communication with a central tubular element through which the pulp is likely to raise;

the de-inked pulp is again supplied to said pulp tower which provides the final accepts;

several cells are placed in battery by connecting them to a common recirculation circuit; and all the cells are connected to a common auxiliary pulp tower which is used for distributing the pulp to be de-inked before supplying said cells.

Another object of the invention is an enclosure with vertical axis including, in its upper portion, a main inlet for the pulp to be de-inked and, in its lower portion, a main outlet for evacuating the de-inked pulp, the pulp moving from the top to the bottom while passing through successive stages provided with passageways for the bubbles introduced in the lower portion of the enclosure and which pass through said passageways from one stage to a higher stage while being mixed again with the pulp, said bubbles raising until the upper portion in which they form a foam charged with hydrophobic particles and evacuated through a foam evacuation outlet, characterized in that said cell includes:

pulp guiding means extending on both sides of the axis of said enclosure, so as to form a guiding path for the pulp and in which said bubble passageways are provided for, said guiding means being, on their lower face, inclined upwards for guiding the bubbles released from the pulp towards said bubble passageways; and narrowing organs extending inside the guiding path, so as to gradually reduce the cross-section for the passing through of the pulp immediately upstream of said bubble passageways of each stage of the cell, in order to create an acceleration of the speed of the pulp at the location of said bubble passageways, to thus aspire the bubbles leaving said passageways, in order to mix them with the pulp.

According to other features of the invention:

said guiding path formed by said guiding means has a helical shape said guiding path formed by said guiding means has a substantially constant cross-section at least over a portion extending downstream of said bubble passageways;

said guiding path formed by said guiding means is ascendant in the direction of flowing of the pulp and extends at least over a portion downstream of said bubble passageways;

said guiding path formed by said guiding means has a zigzag shape the cell includes narrowing organs extending inside the guiding path, so as to gradually reduce the cross-section of passing through of the pulp immediately upstream of said bubble passageways of each stage of the cell;

the bubbles released from the pulp are concentrated in a free space provided for in each stage immediately below each bubble raising passageway the cell includes an organ forming an obstacle to the raising of the bubbles arranged on the lower face of said guiding means immediately behind said bubble passageways;

said organ forming an obstacle connects the upper face of said narrowing organs to the lower face of the guiding means;

the bubble passageways comprise, in each stage, at least one bubble inlet on the lower face of the guiding means, and at least one bubble outlet on the upper face of the latter, said bubble outlet being shifted towards the downstream side with respect to said bubble inlet, in the direction of flowing of the pulp on said bubble outlet;

each stage comprises a plurality of juxtaposed bubble passageways over the full width of the guiding path of the pulp;

said plurality of bubble passageways comprise a common bubble inlet;

said bubble passageways comprise an elongated element the downstream end of which forms said bubble outlet, whereas its upstream end is closed by an element inclined in the direction of flowing of the pulp;

said elongated element has, in cross-section, a V-shape the top of which is directed upwards;

said flotation cell includes a secondary outlet through which the pulp is, in addition, deviated towards a re-circulation circuit in order to be subsequently reinjected, through a secondary inlet, into the enclosure, said secondary outlet being associated to transverse elements allowing to deviate the whole or part of the pulp towards said re-circulation circuit through said secondary outlet said flotation cell comprises a bubble separation zone defined in the lower portion of the enclosure, to separate said bubbles from the pulp re-injected through said secondary inlet, before being evacuated through said main outlet said re-circulation circuit comprises a pulp tower;

said main pulp outlet in the lower portion of said enclosure is in communication with a central tubular element through which the de-inked pulp is likely to raise, in order to be evacuated from the cell;

said main outlet is connected to said pulp tower providing the final accepts several cells are arranged in battery and connected to a common re-circulation circuit;

all the cells are connected to a common auxiliary pulp tower arranged upstream of said main inlets of said enclosures.

Other features and advantages of the invention will become clear from the following description of two non-restrictive embodiments of the invention, with reference to the attached figures.

DETAILED DESCRIPTION OF THE INVENTION

In the figures, identical or equivalent elements are designated by the same reference numerals.

A first embodiment of the invention is shown in FIGS. 1 to 12.

The flotation cell 1 comprises an enclosure 2 with vertical axis A-A. In this first embodiment, this enclosure is cylindrical. It includes, in its upper portion, a main inlet 3 for the paper pulp to be de-inked and, in its lower portion, a main outlet 4 for the de-inked pulp.

The pulp to be de-inked is supplied under a certain pressure into the main inlet 3 and moves from the top to the bottom, passing through successive stages E1, . . . En, to be finally evacuated through the main outlet 4.

During its moving downwards, the pulp passes through these successive stages E1, . . . En, which, in their upper portion, are provided with bubble passageways 13, the bubbles being introduced into the lower portion of the enclosure 2. The number 'n' is generally about 10 and thus corresponds to 10 stages.

The bubbles pass through these passageways 13 from one stage to a higher stage, while being mixed again with the pulp in each higher stage. They raise until the upper portion in which they form a foam 5 charged with hydrophobic particles which is evacuated through a foam evacuation outlet 6.

A counter-stream of water is preferably sent, in the upper portion of the cell, into the stream of de-inking air bubbles after the bubbles have crossed the pulp and have been loaded with ink particles, so that the counter-stream releases the particles (fibers, fines or fillers) drawn along with these de-inking bubbles and draws them with it. The use of such a counter-stream of water is the subject matter of the already mentioned patent application FR 9715839 and will not be described in further detail since it is not directly related to the invention.

The flotation cell 1 can be also connected to a pulp re-circulation circuit 7. When arriving in the lower portion of the enclosure 2 of the cell, the pulp can be deviated towards this re-circulation circuit 7 by leaving through a secondary outlet 8. The pulp is then re-injected into the lower portion of the enclosure through a secondary inlet 9. The re-circulation circuit includes a pump 10 and an air injector 11. The air is thus mixed with the pulp before re-injection of the pulp into the enclosure.

Preferably, and as shown in the figures, all the pulp can be deviated towards the re-circulation circuit and all the air is added by this injector. It would however be possible to deviate only part of the pulp 10 towards the re-circulation circuit and also to provide for an injection of complementary and separate air into the lower portion of the enclosure 2.

According to an important feature of the invention, guiding means for the pulp 12 are provided for inside the enclosure 2, on both sides of the axis A-A of the latter, so as to form a guiding path. In the examples shown in FIGS. 1 to 12, the guiding path formed by these guiding means 12 has a helical shape.

The bubble passageways 13 are provided for in these guiding means 12 which, thanks to their helical shape, are, on their lower face, inclined upwardly for guiding the bubbles released from the pulp towards the bubble passageways 13, which will be described more in detail below.

Generally, each spire of this helical shape defines a stage E with at least one bubble passageway 13. This bubble passageway 13 forms an inlet for the bubbles proceeding from a lower stage and an outlet for these bubbles towards an immediately higher stage. The paper pulp enters at the beginning of each stage immediately upstream of the bubble passageway of the stage, considered in the direction of flowing of the pulp. The bubble raising way is thus completely separated from the descending path of the pulp towards the lower portion of the enclosure 2.

Each stage corresponds to a pulp treating cycle with introduction of the bubbles through the bubble passageway 13, mixing of the bubbles to the pulp, separation of the bubbles from the pulp and guiding of the bubbles towards the bubble passageway conveying the bubbles towards the immediately higher stage. This cycle is repeated in each stage, until the bubbles arrive in the upper stage where they form a foam 5.

A bubble separation zone 14 can be defined in the lower portion of the enclosure, between the secondary pulp inlet 8 and the main pulp outlet 4. Furthermore, this separation zone includes, in the example shown in FIGS. 4 and 5, also helical guiding means forming complete spires in it.

Figure 4:
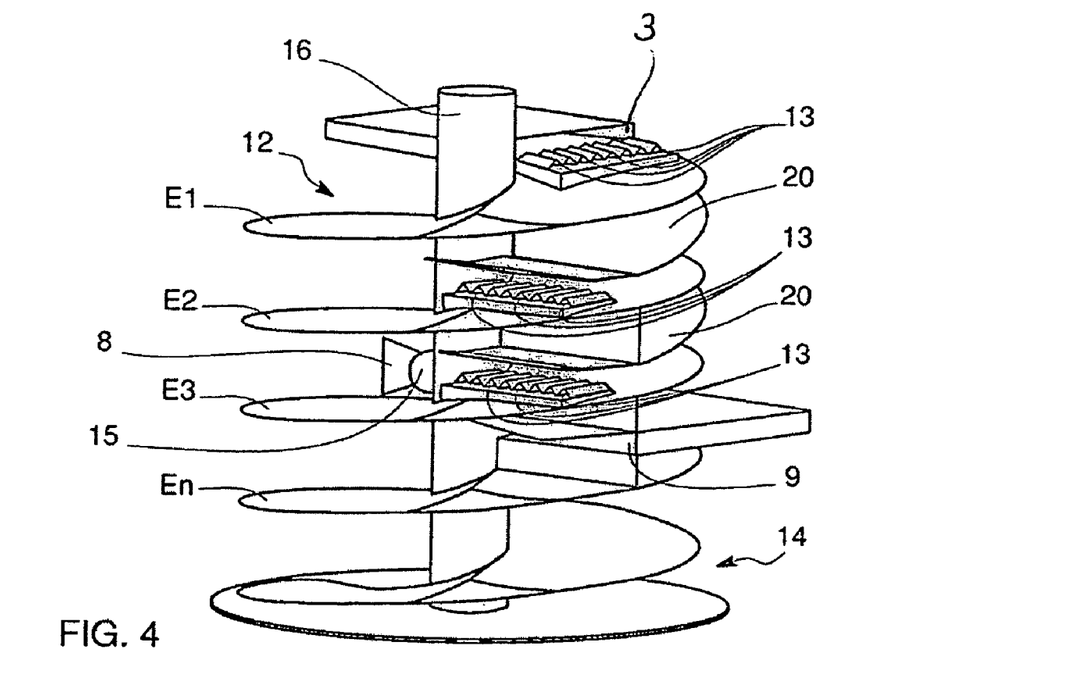
FIG. 4 is a perspective view of the interior of a flotation cell according to the invention.
Figure 6:
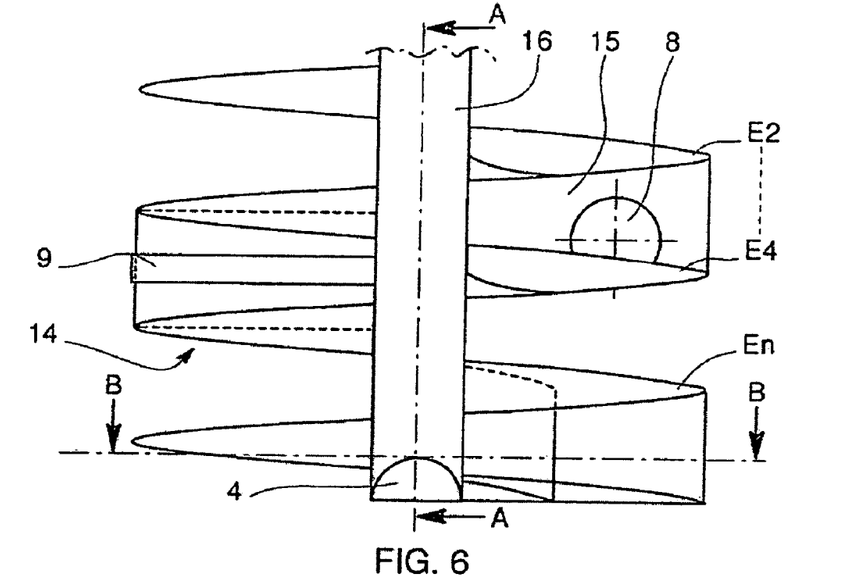
FIG. 6 is a partial longitudinal cross-sectional view of the lower portion of a cell according to the invention.

In order to deviate all the pulp towards the re-circulation circuit 7, the enclosure can be partitioned in its lower portion by transverse elements 15 associated with the secondary pulp outlet 8. FIGS. 4 and 6 show very schematically that these transverse elements are arranged between two spires around this secondary outlet, in order to deviate all the pulp towards the re-circulation circuit 7.

Figure 7:
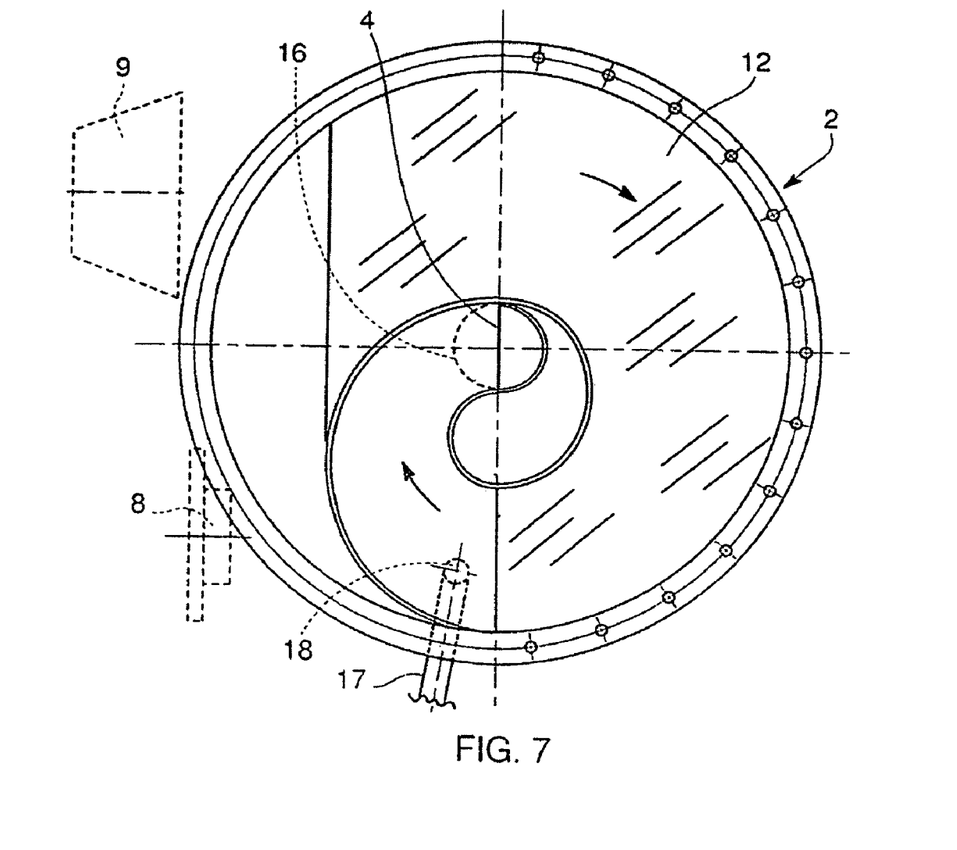
FIG. 7 is a transverse cross-sectional view of the lower portion of the cell of FIG. 6 according to the line B-B of the latter.

FIG. 7 shows the bottom of the enclosure seen in cross-section according to the line B-B in FIG. 6. The location of the secondary pulp outlet 8 and the secondary pulp inlet 9 are indicated in dotted lines in a top view in the figure. This figure shows that near the bottom, the guiding path defined by the guiding means 12 is narrowed and deviated towards the axis A-A of the enclosure 2 in which the main outlet 4 is located. Thus, over 90° of the cylindrical shape of the enclosure, the pulp flow is deviated by about 180° in order to be directed towards this main outlet opening 4 located in the center.

Figure 1:
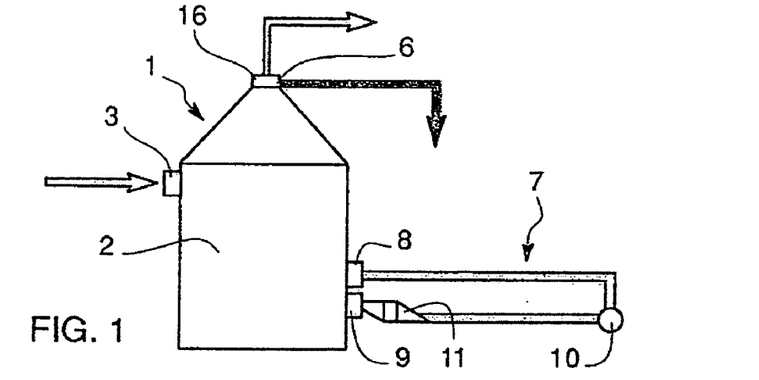
FIG. 1 is a schematic view showing a flotation cell according to the invention with indication of the directions of flowing of the paper pulp.
Figure 2:
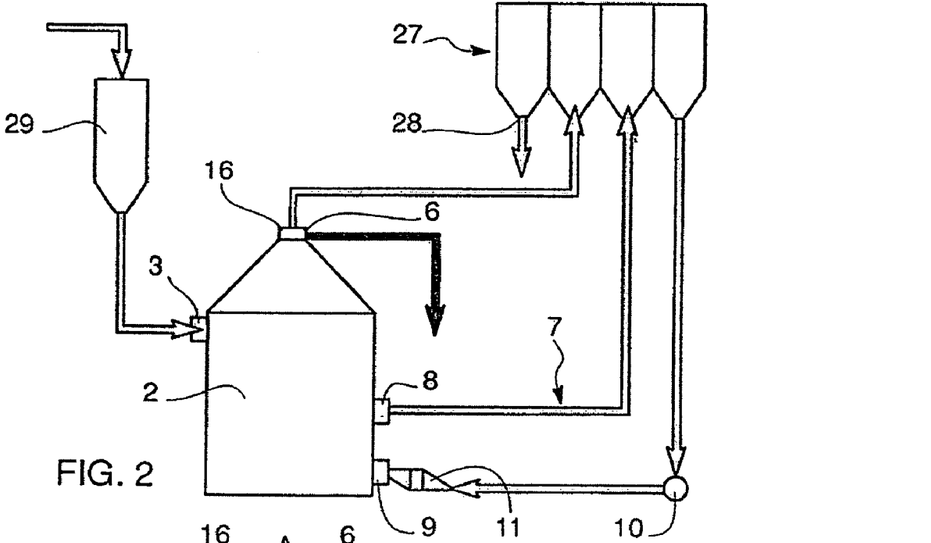
FIG. 2 is a another schematic view showing a flotation cell according to the invention arranged in series with other identical cells.

The main opening 4 ends into a pulp evacuation tube 16. This tube 16 extends in the axis of the enclosure 2, to end at the top of the latter. FIG. 1 indicates that the accepts which leave this tube are then directed for example towards a recovery vat (not shown).

Preferably, the first length inside the tube 12 includes an element forming a trough (not shown) inclined upwards according to an angle of about 45° in order to facilitate the raising of the pulp in the tube.

FIG. 7 shows, furthermore, a draining tube 17 connected to a hole 18 in the bottom of the enclosure 2, in order to allow the emptying of same.

According to an important feature of the invention, narrowing organs 19 are provided for in the guiding path defined by the guiding means 12. These narrowing organs are arranged in each stage so as to gradually reduce the cross-section for the passing through of the pulp immediately upstream of the bubble passageways 13 of each stage of the cell 1. This reduction of the cross-section for the passing through of the pulp results into creating an acceleration the speed of the pulp at this well-defined location.

Figure 5:
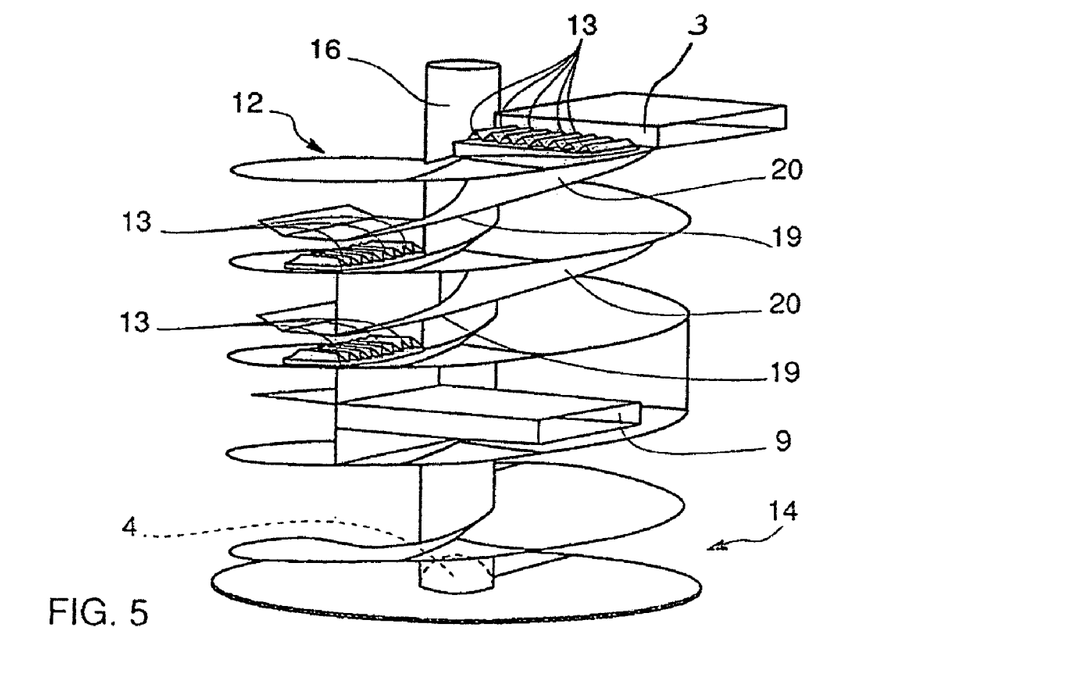
FIG. 5 is a perspective view similar to the view shown in FIG. 4, turned by 90°.
Figures 8, 9:
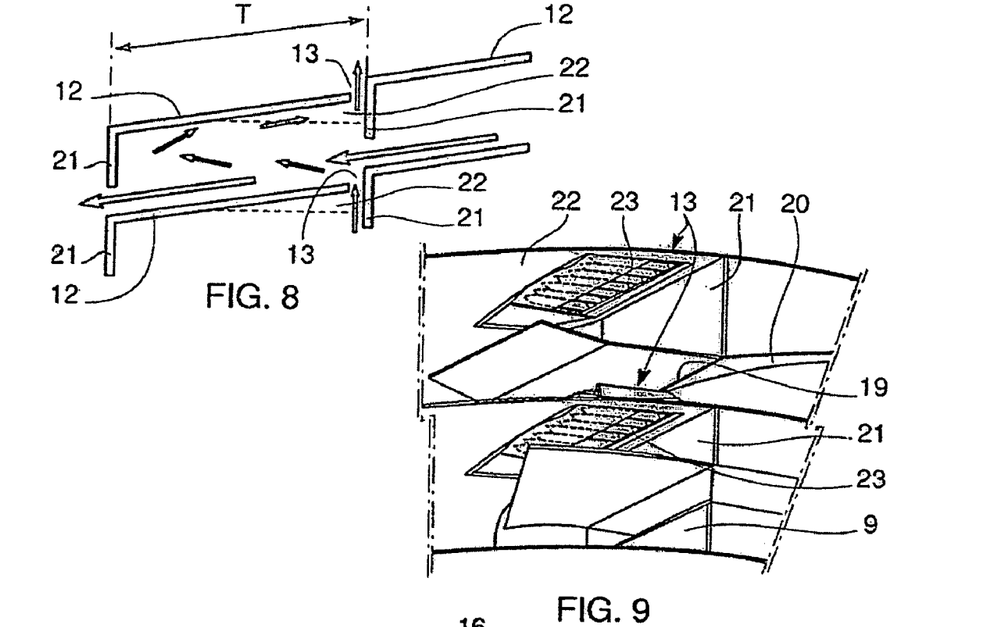
FIG. 8 is a schematic view of a flow diagram showing the circulation flows for the paper pulp and the air bubbles between two stages of a cell according to the invention.
FIG. 9 is a partial perspective view from below of the interior of a cell according to the invention.

In the example shown in FIGS. 4, 5 and 9, these narrowing organs 19 include a plate 20 hung from the lower face of a guiding means 12 and which extends in the flowing direction of the pulp, so that the cross-section for the passing through of the pulp is reduced above the bubble passageways 13, after which the plate is inclined upwards in order to widen again the cross-section for the passing through.

Through a venturi effect, there is thus created an acceleration of the speed of the pulp, which reaches its maximum at the location of the bubble passageways 13 in order to aspire into the pulp the bubbles leaving these passageways. It is important for this acceleration of the speed of the pulp to occur directly before the mixing of the bubbles with the pulp, in order to adjust the speed difference between the bubbles and the pulp, so as to optimize the efficiency of collecting of the hydrophobic particles of the pulp by the bubbles and to facilitate the raising of the bubbles from the immediately lower stage.

The ratio between the speed of circulation of the bubbles and the speed of circulation of the pulp is advantageously between 0.5 and 2, and preferably between 0.7 and 1.3. This ratio can be achieving by imparting to the pulp a speed of about 1.7 m/s at the level of the main inlet 3, and by imparting to the bubbles a speed of about 2.1 m/s at the level of the injector 11, i.e. a ratio of about 1.23.

Thus, after mixing the pulp which has just been accelerated with the bubbles entering through the bubble passageway 13 and thanks to this conformation according to the invention of each stage, the kinetic energy of the pulp is partially converted into static pressure, in order:

a) to increase the time of contact between the pulp and the bubbles,
   b) to facilitate separation enters the pulp and the bubbles,
   c) to reduce the total loss of pressure,
   d) to allow a further acceleration of the pulp at the beginning of the next stage.

This allows to superimpose a large number of stages while having a lowest static pressure at the location of introduction of the bubbles, with a view to minimizing the energy consumption.

In order to prevent the bubbles released from the pulp from raising too far while following the lower face of the guiding means 12 with a helical shape, a vertical organ forming an obstacle 21 is arranged on the lower face of the guiding means immediately behind these bubble passageways 13 (see FIGS. 8 and 9).

Thanks to the inclined shape of this lower surface of the guiding means 12, in combination with this organ forming an obstacle 20, is formed a free space 22 for concentration of the ascending bubbles immediately below each bubble raising passageway 13.

FIG. 8 shows, in a flow diagram, a full turn (T) or spire of the guiding means 12 with indications of pulp flow by means of thicker and longer arrows and the raising of the bubbles by means of shorter and thinner arrows. It can be seen that the bubbles raising through a bubble passageway 13 are first of all mixed into the pulp and drawn along with the latter, to then be released to raise while following the inclined lower face with a helical shape.

The bubble passageways 13 comprise, at each stage, at least one bubble inlet 23 on the lower face of the guiding means 12, and at least one bubble outlet 24 on the upper face of the latter.

Each stage advantageously comprises a plurality of juxtaposed bubble passageways 13 over the full width of the guiding path for the pulp, for a better distribution of the bubbles in the latter.

In the examples shown in the figures, the bubble outlet 24 of each bubble passage 13 is shifted towards the downstream side with respect to the bubble inlet 23 in the flow direction of the pulp towards the bubble outlet 24.

This shift is achieved thanks to the fact that the passageways include elongated elements 25 arranged in the flow direction of the pulp on the upper face of the guiding means 12 and the downstream end of which forms the bubble outlet 24, while their upstream end is closed by an element 26 inclined according to an angle a in the flow direction of the pulp.

In transverse cross-section, these elongated elements advantageously have a V-shape (or a half-moon shape) the top of which is directed upwards. The opposite face of this V-shape is directed downwards and extends partially on the upper face of the guiding means 12 and partially on the bubble outlet 24.

Figure 10:
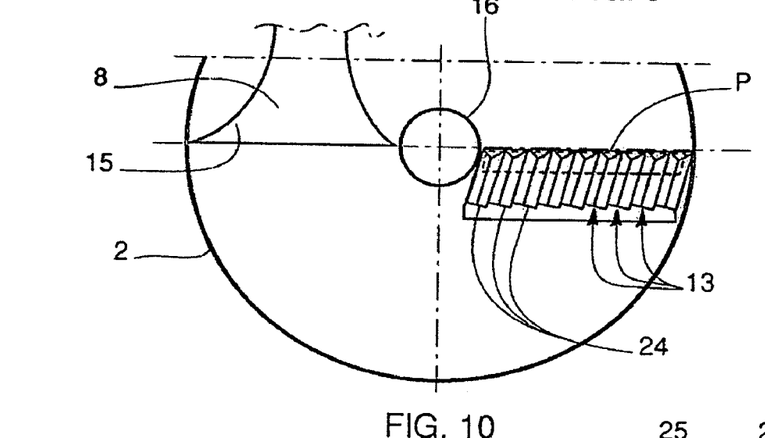
FIG. 10 is a partial top view of a stage of a cell according to the invention.
Figure 11:
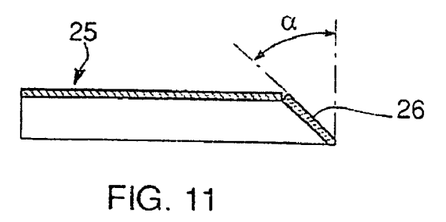
FIGS. 11 and 12 are cross-sectional and top views respectively of some elements of FIG. 10, respectively.
Figure 12:
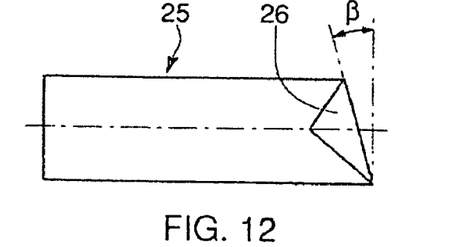

FIG. 10 shows that these juxtaposed elements are slightly inclined towards the axis of the enclosure 2, in order to better follow the flowing of the pulp. For the same reason, the closing element 26 of the elongated element 25 is, preferably, inclined according to an angle β, in order to be aligned along a radius r of the enclosure 2. In this way, a useless pressure loss is avoided when the pulp passes over the elongated elements 25 forming the bubble passageways 13.

With this use of a plurality of elongated elements 25 which each define a bubble outlet 24, only one bubble inlet 23 is required, which is common for all passageways 13.

In order to stabilize the circulation in the flotation cell, the re-circulation circuit 7 comprises a pulp tower 27 (see FIG. 2) which receives the pulp that leaves through the secondary outlet 8 of the enclosure 2 and sends it back to the secondary inlet 9 of the latter, passing through the pump 10 and the air injector 11. This pulp tower also receives the pulp which leaves the enclosure through the main outlet 12 after its passing through the lower portion of the enclosure. Part of the de-inked pulp is re-mixed, in the pulp tower, with the pulp proceeding from the re-circulation circuit 7, while the rest of the de-inked pulp leaves the pulp tower through the outlet 28 in the form of final accepts.

The flotation cell 1 easily allows an arrangement in battery with several cells of the same kind. All the cells can then advantageously be connected to a common re-circulation circuit 7. Furthermore, only one pump 10 is required for several injectors 11 associated with a respective cell.

In the case of this arrangement in battery, all the cells 1 are located upstream of the main inlets 4 advantageously connected to an auxiliary pulp tower 29 used for a proper distribution of the pulp to the different cells.

Figure 13:
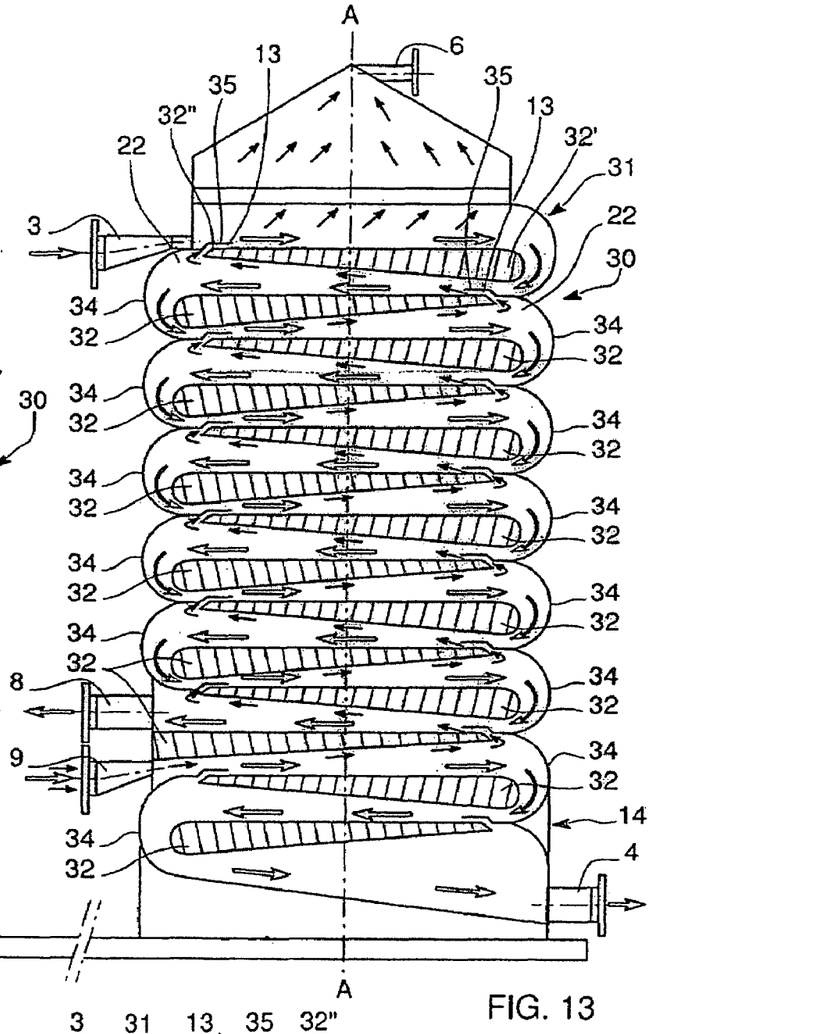
FIG. 13 is a schematic, longitudinal cross-sectional view of another embodiment of the cell according to the invention.
Figure 14:
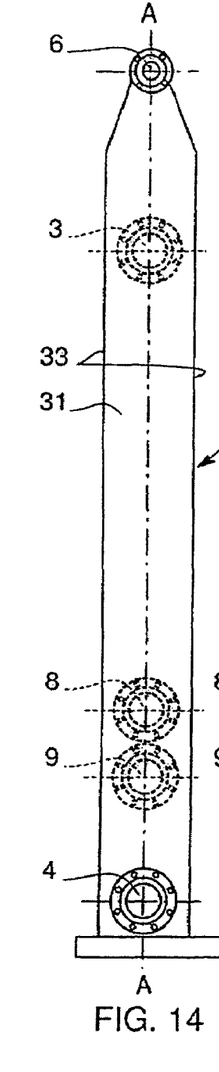
FIG. 14 is a schematic side view of the cell of FIG. 13.
Figure 15:
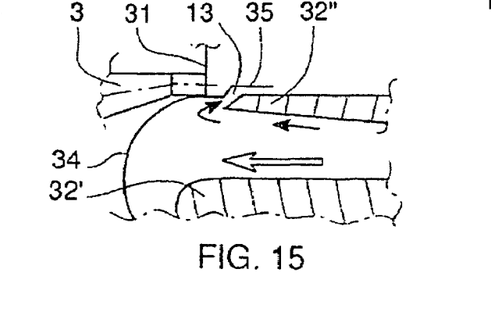
FIG. 15 shows a close-up schematic view with more in detail a bubble passageway of FIG. 13.

FIGS. 13 and 14 schematically show a second embodiment of the flotation cell 30 according to the invention. Identical or similar elements are designated by the same reference numerals as the elements already described with reference to FIGS. 1 to 12.

The flotation cell 30 includes an enclosure 31 with a globally parallelepipedal shape, here rectangular and much longer than wide, inside which are arranged means for guiding the pulp from the top to the bottom, from an upper stage to a lower stage. These guiding means include elongated transverse elements 32 extending on both sides of the axis A-A of the enclosure, in order to form a zigzag guiding path.

Each transverse element 32 connects two opposite side walls 33 parallel to each other. In the example shown, each transverse element 32 has an upper surface which is primarily horizontal, whereas its lower face is inclined upwardly, in order to guide the bubbles released from the pulp during their upward movement.

The end (32') of the transverse element 32 which is thickest is round and defines, together with part of the side wall 34, also round, the cross-section for the passing through of the pulp from an upper stage to a lower stage. The opposite end (32") of the transverse element 32, which is thinnest, is beveled and associated with an bubble guiding element 35 which extends in front of this thin end (32") and partially above the upper face of the transverse element 32, so as to form with the latter a passageway 13 for the ascending bubbles.

The transverse elements 32 are thus arranged alternately so that the thick end 32' is always arranged above the thin end 32" of the transverse element placed immediately below, so as to form with the portion of rounded wall 34 narrowing organs extending inside the guiding path so as to gradually reduce the cross-section for the passing through of the pulp immediately upstream of the bubble passageways 13 of each stage of the cell.

Furthermore and like in the previously described embodiment, a free space for concentration of the bubbles 22 is created immediately below each bubble passageway 13 by the transverse elements 32 and the portions of rounded side wall 34.

Figure 3:
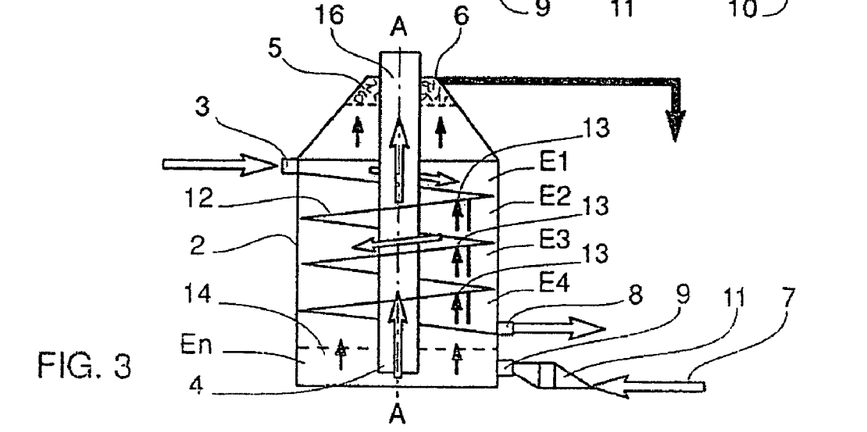
FIG. 3 is a sectional view showing the flowing paths for the pulp and the bubbles inside a flotation cell according to the invention.

In the lower portion, a transverse element 32 is, at its one end, connected to a wall of the enclosure 31, so as to deviate all the paper pulp towards a secondary outlet 8 leading to a re-circulating circuit 7 such as the one described with reference to FIGS. 1 to 3.

In a particular embodiment of the invention, the walls of the guiding path formed by said guiding means 13 deviate from the bubble passageway 13 and in the direction of flowing of the pulp, thus forming a slight increase of the cross-section of the guiding path. The latter then has the form of a widening at least over a portion extending downstream of said bubble passageways 13.

Figure 16:
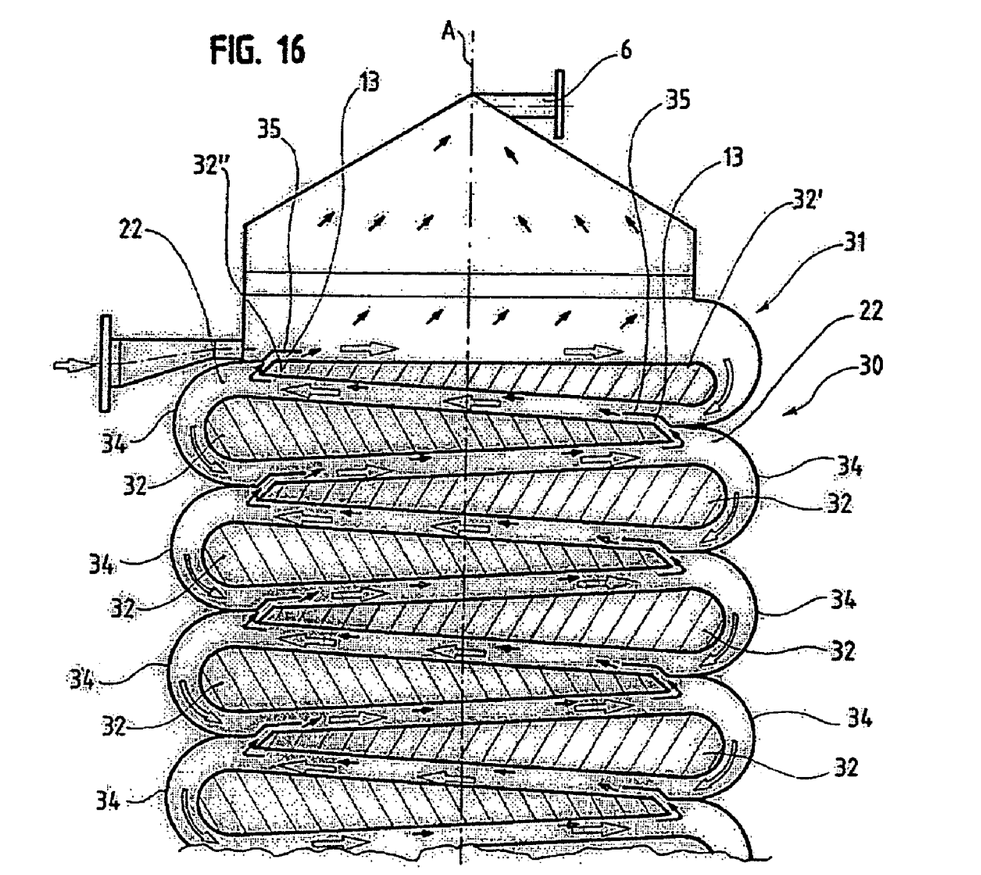
FIG. 16 is a partial and longitudinal cross-sectional view of another embodiment of the cell according to the invention.
Figure 17:
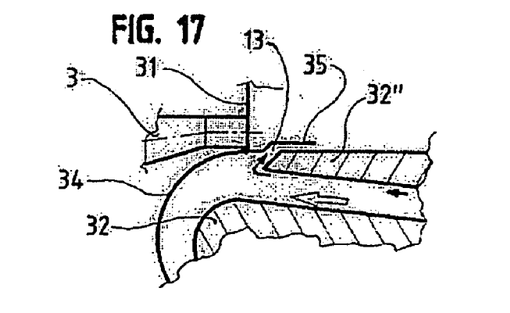
FIG. 17 shows a close-up schematic view with more in detail a bubble passageway of FIG. 16.

In another particular embodiment of the invention, which can be seen in FIGS. 16 and 17, the guiding path formed by these guiding means 12 includes a substantially constant section at least over a portion extending downstream of said bubble passageways.

The substantially constant section of the guiding path allows a deceleration of the pulp by the wall-attachment effect, with a view to releasing the bubbles.

Preferably, the guiding means 12 are, on their upper face, inclined upwardly, parallel to the lower surfaces, in order to form an ascending guiding path 13 in the direction of flowing of the pulp. This inclined guiding path 13 extends at least over a portion downstream of said bubble passageways. This ascending slope increases the deceleration of the pulp, with a view to releasing the bubbles.

The other elements of these embodiments will not be described in detail, since they are identical to those already described with reference to the first embodiment.

Of course, this flotation cell 30 can also be arranged in battery with several cells according to the invention.

The operation of the cells is strictly identical for the first and the second embodiments. The paper pulp is fed under pressure into the enclosure 2, 31 through the main inlet 3, after which it moves downward along to the guiding path due to the pressure and to gravity, until it arrives in the lower portion in which it is deviated towards the secondary outlet 8 to enter into the re-circulation circuit. From this re-circulation circuit, the pulp passes through a pump 10 and air is added by an injector 11 before re-injection of the pulp into the enclosure 2, 31 through the secondary entry 9. In the bubble separation zone 14 of the lower portion, bubbles are released from the pulp and raise while following the lower faces of the guiding means (12; 13) to arrive in the bubble passageways 13 towards the immediately higher stage where they are re-mixed with the pulp to be loaded with hydrophobic particles. The bubbles raise until the top of the enclosure, to form there a foam which is evacuated through the foam exit 6. The de-inked pulp leaves the enclosure through the main outlet 4 at the bottom of the lower portion, to be recovered in the form of final accepts, either directly or after having passed once again through the pulp tower.

We claim:

1. A process for de-inking paper pulp in a flotation cell, the process comprising:
   introducing the paper pulp into a top of the flotation cell;
   passing air bubbles into the flotation cell from a bottom of the flotation cell;
   moving the pulp from said top of the flotation cell toward said bottom of the flotation cell through a plurality of stages;

crossing the moving pulp with the air bubbles in each of said plurality of stages so as to mix the air bubbles with the moving pulp, the air bubbles moving from said bottom of the flotation cell toward said top of the flotation cell through bubble passageways formed on each of the stages;

separating the air bubbles from the mixture of air bubbles and the moving pulp in each of the stages so that the pulp is de-inked;

forming a foam of the separated air bubbles in the flotation cell, said foam having hydrophobic particles therein;

evacuating the foam from the flotation cell;

evacuating the de-inked pulp from a lower portion of the flotation cell, said step of moving the pulp comprising:

guiding the pulp along guide surfaces corresponding to each of said plurality of stages, each of the guide surfaces extending on both sides of a central axis of the flotation cell, the guide surfaces having said bubble passageways therethrough, the air bubbles following a face of the guide surfaces while passing upwardly; and accelerating a speed of the pulp moving directly from one of said plurality of stages to another of said plurality of stages within the flotation cell without the use of a pump by gradually reducing a cross-section between the guide surfaces immediately upstream of said bubble passageways.

2. The process of claim 1, a ratio of a speed of passing the air bubbles and the speed of moving the pulp being between 0.5 and 2.

3. The process of claim 1, said guide surfaces forming a helical guiding pathway.

4. The process of claim 3, said guiding pathway having a widening at least over a portion of said guide surfaces downstream of said bubble passageways.

5. The process of claim 3, said guiding pathway having a substantially constant cross-section at least over a portion of said guide surfaces downstream of said bubble passageways.

6. The process of claim 3, said guiding pathway being ascendant in a direction in which the pulp flows downstream of said bubble passageways.

7. The process of claim 3, said guiding pathway forming a zigzag guiding path.

8. The process of claim 1, said step of separating comprising:

concentrating the air bubbles released from the pulp in a free space immediately below each of said bubble passageways.

9. The process of claim 1, said step of separating comprising:

guiding the air bubbles released from the pulp toward each of said bubble passageways.

10. The process of claim 1, further comprising:

deviating the introduced paper pulp toward a re-circulation circuit;

reinjecting the deviated pulp into the lower portion of the flotation cell.

11. The process of claim 3, said re-circulation circuit connected to a pulp tower.

12. The process of claim 1, said step of evacuating the de-inked pulp comprising:

evacuating the de-inked pulp through a main outlet at said lower portion of the flotation cell, said main outlet being in communication with a central tubular element in the flotation cell; and raising the de-inked pulp through said central tubular element.

13. The process of claim 12, further comprising:

delivering the de-inked pulp from said central tubular element to a pulp tower.

14. An apparatus for de-inking paper pulp comprising:

a flotation cell having a vertical axis, said flotation cell having a main pulp inlet in an upper portion thereof and a main de-inked pulp outlet in a lower portion thereof;

air bubble generating means connected to said flotation cell at said lower portion thereof, said air bubble generating means for passing air bubbles into said flotation cell such that the air bubbles mix with a paper pulp as the air bubbles move toward said upper portion of said flotation cell through bubble passageway, said flotation cell suitable for receiving the air bubbles in a top thereof as passed by said air bubble generating means;

a foam evacuation outlet connected to said flotation cell so as to allow the air bubbles in said flotation cell to pass therefrom;

a pulp guiding means extending on both sides of said vertical axis of said flotation cell for guiding the movement of the paper pulp, said bubble passageways being formed on said pulp guiding means, said pulp guiding means defining a plurality of stages in said flotation cell, said pulp guiding means having guide surfaces that are inclined on a lower face thereof for guiding bubbles released from the paper pulp toward said bubble passageways, wherein said pulp guiding means is free of any pump between at least one of said plurality of stages and a second successive one of said plurality of stages;

a plurality of narrowing organs affixed to said guide surfaces, said plurality of narrowing organs reducing a cross-sectional area for the movement of the paper pulp upstream of the bubble passageways from one of said plurality of stages to another of said plurality stages so as to accelerate a speed of the movement of the pulp adjacent the bubble passageways from said one of said plurality stages directly to said another of said plurality of stages.

15. The apparatus of claim 14, said guide surfaces defining a guiding path of helical shape.

16. The apparatus of claim 15, said guiding path having a widening downstream of said bubble passageways.

17. The apparatus of claim 15, said guiding path having a substantially constant cross-section downstream of said bubble passageways.

18. The apparatus of claim 15, said guiding path being ascendant in a direction of the movement of the paper pulp and downstream of said bubble passageways.

19. The apparatus of claim 15, said guiding path having a zigzag shape.

20. The apparatus of claim 14, each of said plurality of stages defining a free space immediately below respective bubble passageways.

21. The apparatus of claim 14, said guiding means having an obstacle formed immediately behind said bubble passageways.

22. The apparatus of claim 21, said obstacle connected an upper face of each of said plurality of narrowing organs to a lower face of said guiding means.

23. The apparatus of claim 14, each of said bubble passageways having a bubble inlet on a lower face of said guiding means of a bubble outlet on an upper face of said guiding means, said bubble outlet shifted toward a downstream side relative to said bubble inlet in the direction of pulp flowing over said bubble outlet.

24. The apparatus of claim 23, each of said plurality of stages comprise a plurality of juxtaposed bubble passageways.

25. The apparatus of claim 24, said plurality of juxtaposed bubble passageways having a common bubble inlet.

26. The apparatus of claim 23, each of said bubble passageways comprising an elongated element with said bubble outlet at a downstream end thereof, said elongated element having an upstream end closed by an element inclined in a direction of the flow of the paper pulp.

27. The apparatus of claim 26, said elongated element having a V-shaped cross-section.

28. The apparatus of claim 14, further comprising:
a secondary outlet connected to said lower portion of said flotation cell;
a re-circulation circuit connected to said secondary outlet;
a secondary inlet connected to said re-circulating circuit and connected to said lower portion of said flotation cell, said secondary outlet having transverse elements suitable for deviating the pulp toward said re-circulation circuit through said secondary outlet.

29. The apparatus of claim 28, further comprising:
a bubble separating means formed in said lower portion of said flotation cell for separating bubbles from the pulp re-injected through said secondary inlet.

30. The apparatus of claim 28, said re-circulation circuit comprising a pulp tower.

31. The apparatus of claim 14, said main pulp outlet being in communication with a central tubular element.

32. The apparatus of claim 30, said main pulp tower being connected to said pulp tower.

* * * * *